(12) United States Patent
Ejury

(10) Patent No.: US 9,729,056 B2
(45) Date of Patent: Aug. 8, 2017

(54) CHARGE INJECTION CIRCUIT FOR INSTANTANEOUS TRANSIENT SUPPORT

(71) Applicant: Infineon Technologies AG, Neubiberg (DE)

(72) Inventor: Jens Ejury, Fremont, CA (US)

(73) Assignee: Infineon Technologies AG, Neubiberg (DE)

( * ) Notice: Subject to any disclaimer, the term of this patent is extended or adjusted under 35 U.S.C. 154(b) by 43 days.

(21) Appl. No.: 14/735,505

(22) Filed: Jun. 10, 2015

(65) Prior Publication Data
US 2016/0365789 A1    Dec. 15, 2016

(51) Int. Cl.
*H02M 3/158*    (2006.01)
*H02M 3/156*    (2006.01)

(52) U.S. Cl.
CPC .... *H02M 3/158* (2013.01); *H02M 2003/1566* (2013.01)

(58) Field of Classification Search
CPC ......... H02M 3/156; H02M 3/158; G05F 1/10; G05F 1/462; G05F 1/56; G05F 1/565
See application file for complete search history.

(56) References Cited

U.S. PATENT DOCUMENTS

| | | | | |
|---|---|---|---|---|
| 5,955,870 A * | 9/1999 | Nair | ........................ | G05F 1/575 |
| | | | | 323/273 |
| 6,271,704 B1 * | 8/2001 | Babcock | ............. | H04L 25/0298 |
| | | | | 327/309 |
| 2008/0272657 A1 * | 11/2008 | Hull | ....................... | G11C 5/147 |
| | | | | 307/113 |
| 2009/0167260 A1 | 7/2009 | Pauritsch et al. | | |
| 2011/0115454 A1 * | 5/2011 | Benedict | ............... | H02M 3/156 |
| | | | | 323/282 |
| 2011/0298280 A1 * | 12/2011 | Homol | ..................... | H03F 3/72 |
| | | | | 307/31 |
| 2014/0021930 A1 | 1/2014 | Liu et al. | | |

FOREIGN PATENT DOCUMENTS

| | | |
|---|---|---|
| DE | 10242332 A1 | 3/2004 |
| DE | 10351050 A1 | 6/2005 |
| DE | 102005030123 A1 | 1/2007 |

* cited by examiner

*Primary Examiner* — Matthew Nguyen
(74) *Attorney, Agent, or Firm* — Murphy, Bilak & Homiller, PLLC

(57) ABSTRACT

A voltage regulator circuit includes a voltage regulator electrically coupled to a load through an output inductor and operable to regulate a voltage applied to the load, an output capacitor electrically coupled to a node between the inductor and the load, and a charge injection circuit capacitively coupled to the node. The output capacitor is configured to discharge energy stored in the capacitor to the load during step-up transient events at the load and absorb energy from the load during step-down transient events at the load. The charge injection circuit is operable to inject charge onto the output capacitor during the step-up transient events and absorb charge from the output capacitor during the step-down transient events.

18 Claims, 5 Drawing Sheets

CHARGE INJECTION CIRCUIT FOR INSTANTANEOUS TRANSIENT SUPPORT

TECHNICAL FIELD

The present application relates to switching voltage regulators, and more particularly to instantaneous transient support for switching voltage regulators.

BACKGROUND

Switching voltage regulators are widely used in modern electronic systems for a variety of applications such as computing (server and mobile) and POLs (Point-of-Load Systems) for telecommunications because of their high efficiency and small amount of area/volume consumed by such converters. Widely accepted switching voltage regulator topologies include buck, boost, buck-boost, forward, flyback, half-bridge, full-bridge, and SEPIC topologies. Multi-phase buck converters are particularly well suited for providing high current at low voltages needed by high-performance integrated circuits such as microprocessors, graphics processors, and network processors. Buck converters are implemented with active components such as a pulse width modulation (PWM) controller IC (integrated circuit), driver circuitry, one or more phases including power MOSFETs (metal-oxide-semiconductor field-effect transistors), and passive components such as inductors, transformers or coupled inductors, capacitors, and resistors. Multiple phases (power stages) can be connected in parallel to the load through respective inductors to meet high output current requirements.

Steep load transients (e.g. a step-up transition from 0 A or near 0 A to 200 A or more in less than 1 µs) typically require extensive and costly capacitor decoupling solutions to prevent the output voltage from falling below or rising above a specified limit. Regulator topologies that utilize inductive coupling to the load have an inherent limitation on the bandwidth with which the regulator can respond, due to the limited current ramp rate (slew rate) through the output inductors used to couple the regulator to the load. Conventional regulator controllers typically have transient support features for enabling all phases of a multiphase regulator to simultaneously source or sink current. Also, bypass switches have been used to discharge the output capacitor if needed. Regulator phases for supporting only AC content have been used as a bypass to the regulator. However, general improvement of regulator bandwidth requires smaller inductor values and higher switching frequency at the expense of efficiency. As such, a solution for handling steep load transient events which does not require a larger output capacitor, smaller output inductors, large bypass switches and/or an increased number of phases is desirable.

SUMMARY

According to an embodiment of a voltage regulator circuit, the circuit comprises a voltage regulator electrically coupled to a load through an output inductor and operable to regulate a voltage applied to the load, an output capacitor electrically coupled to a node between the inductor and the load, and a charge injection circuit capacitively coupled to the node. The output capacitor is configured to discharge energy stored in the capacitor to the load during step-up transient events at the load and absorb energy from the load during step-down transient events at the load. The charge injection circuit is operable to inject charge onto the output capacitor during the step-up transient events and absorb charge from the output capacitor during the step-down transient events.

According to an embodiment of a method of regulating a load, the method comprises: regulating a voltage applied to the load via a voltage regulator electrically coupled to the load through an output inductor; discharging energy stored in an output capacitor to the load during step-up transient events at the load, the output capacitor being electrically coupled to a node between the inductor and the load; absorbing energy from the load via the output capacitor during step-down transient events at the load; injecting charge onto the output capacitor during the step-up transient events via a charge injection circuit capacitively coupled to the node; and absorbing charge from the output capacitor during the step-down transient events via the charge injection circuit.

According to an embodiment of a charge injection circuit for a voltage regulator circuit electrically coupled to a load through an output inductor and having an output capacitor electrically coupled to a node between the inductor and the load, the charge injection circuit comprises a first switch, a second switch, an auxiliary capacitor having a first terminal electrically coupled to the node without using an inductor and a second terminal switchably coupled to a first voltage rail through the first switch and to a second voltage rail different than the first voltage rail through the second switch, and a bias voltage applied to the second terminal of the auxiliary capacitor. The first switch is configured to electrically couple the second terminal of the auxiliary capacitor to the first voltage rail during step-up transient events at the load. The second switch is configured to electrically couple the second terminal of the auxiliary capacitor to the second voltage rail during step-down transient events at the load.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein directly inject charge onto or directly absorb charge from the output capacitor of a switching voltage regulator during transient load events to provide instantaneous or near instantaneous transient support. The charge injection circuit described herein is capacitively coupled to the output capacitor without the use of an inductor, and injects charge onto the output capacitor during step-up transient events and absorbs charge from the output capacitor during step-down transient events. Switches included in the charge injection circuit are turned on to charge or discharge the output capacitor directly to a voltage rail (e.g. Vin, GND or any voltage in general) via an auxiliary capacitor. Short response times provided by the charge injection circuit effectively reduce the capacitance value of the output capacitor, improving the overall output voltage response of the regulator. The embodiments described herein apply to both single-phase and multi-phase switching voltage regulators. The terms 'phase' and 'power stage' are used interchangeably herein to describe the output components (e.g. driver circuitry, high side and low side transistors, inductors, etc.) of a switching voltage regulator which contribute to the total current delivered to the load under regulation.

Figure 1:
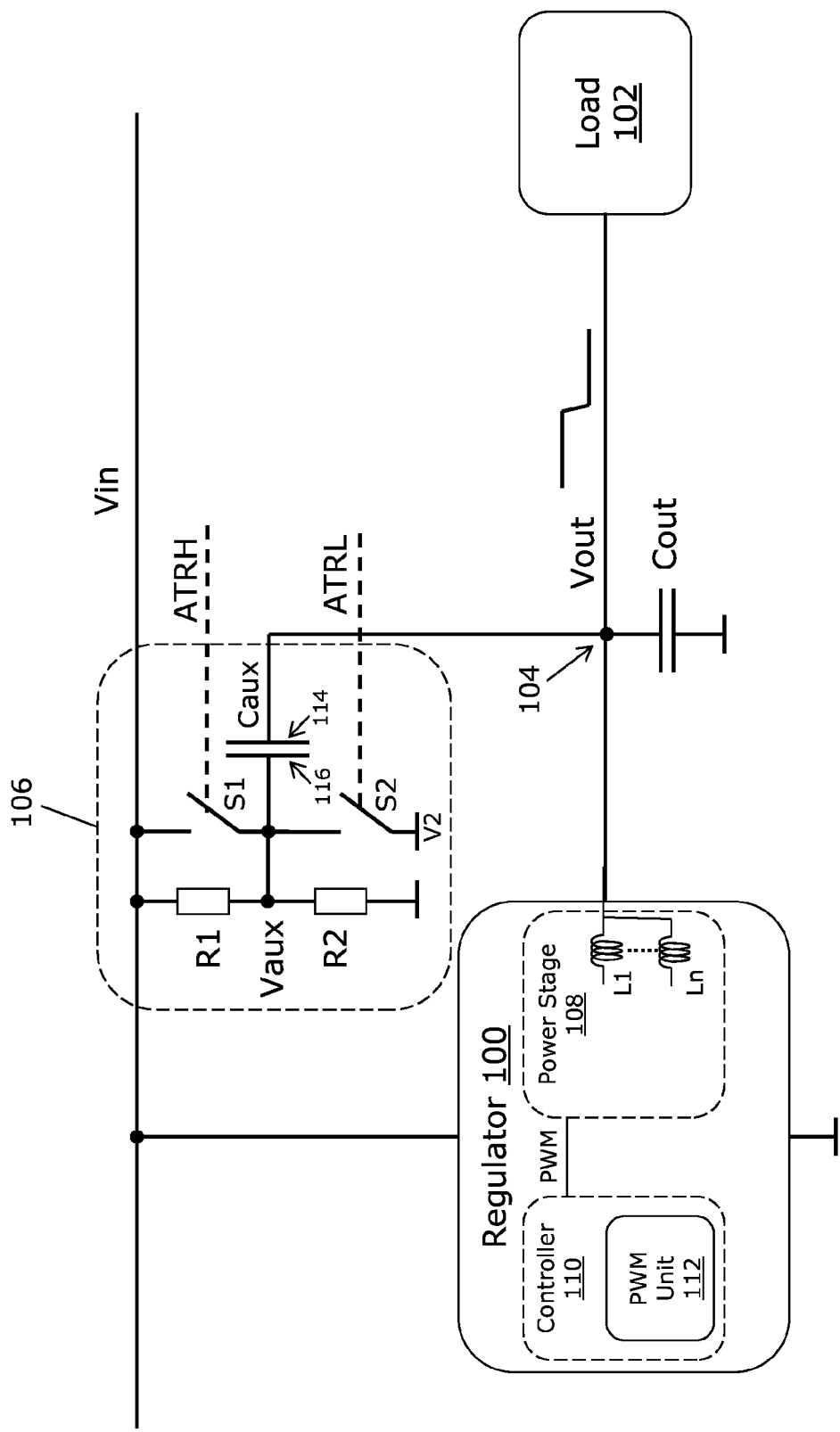
FIG. 1 illustrates a block diagram of an embodiment of a switching voltage regulator having instantaneous transient support.

FIG. 1 illustrates an embodiment of a voltage regulator circuit. The voltage regulator circuit includes a voltage regulator 100 electrically coupled to a load 102, an output capacitor Cout electrically coupled to a node 104 between the regulator output and the load 102, and a charge injection circuit 106 capacitively coupled to the same node 104 as the output capacitor Cout. The voltage regulator 100 includes a power stage 108 configured to produce an output voltage (Vout) from an input voltage rail (Vin), and a controller 110 such as a microcontroller, microprocessor, ASIC (application-specific integrated-circuit), etc. operable to control switching of the power stage 108. The power stage 108 is electrically coupled to the load 102 through one or more output inductors (L1, . . . , Ln) and the output capacitor Cout. The voltage regulator 100 can have any inductively coupled topology such as buck, boost, buck-boost, forward, flyback, half-bridge, full-bridge, etc.

The power stage 108 has one or more phases inductively coupled to the load 102 through the corresponding output inductor. Each phase has a high-side transistor and a low-side transistor. The high-side transistor switchably connects the load 102 to the input voltage rail (Vin) of the regulator 100, and the corresponding low-side transistor Q2 switchably connects the load 102 to a second voltage rail e.g. ground at different periods. In general, the power stage 108 can include any desired number of phases including one phase (single-phase implementation) or more than one phase (multi-phase implementation). The load 102 powered by the voltage regulator 100 can be a high-performance integrated circuit such as a microprocessor, graphics processor, network processor, etc. or other type of integrated circuit requiring voltage regulation such as a POL (point-of-load).

The voltage regulator 100 is operable to regulate the voltage Vout applied to the load 102. In the case of the voltage regulator 100 being electrically coupled to the load 102 through one or more output inductors (L1, . . . , Ln), the output capacitor Cout is electrically coupled to a node 104 between the output inductor(s) and the load 102. In the case of a single-phase voltage regulator, the power stage 108 includes a single output inductor L1 which inductively couples the regulator 100 to the load 102. In the case of a multi-phase voltage regulator, the power stage 108 includes an output inductor L1, . . . , Ln for each phase of the power stage 108. Each phase is inductively coupled to the load 102 through the corresponding output inductor L1, . . . , Ln.

The regulator controller 110 regulates the voltage Vout applied to the load 102 by the power stage 108, by adjusting the current delivered to the load 102. The controller 110 can include a pulse width modulator (PWM) unit 112 for switching the transistors of the power stage 108 via a corresponding PWM control signal (PWM) so that the power stage 108 sources or sinks current to the load 102. When the PWM control signal is at a logic level high, the corresponding high-side transistor is placed in a conductive state, the inductor current is sourced through the high-side transistor, and the current through the inductor increases for the duration. If current is sunk through the high-side transistor, the inductor current decreases. This is generally referred to as 'on-time'. When the PWM control signal is at a logic level low, the corresponding low-side transistor is placed in a conductive state, current is sourced or sunk from the low-side transistor, and the current through the inductor decreases for the duration. This is generally referred to as 'off-time'. When the PWM control signal is at a trivalent or high impedance logic level (the PWM control signal is neither high nor low), both the high-side and low-side transistors are placed in a non-conductive state, current is sourced or sunk through either the low-side or high side transistor body diode, and the magnitude of the current through the inductor decreases towards zero. This is generally referred to as the 'HiZ-time' or 'inactive time' and the power stage 108 is considered to be in 'High Z' or inactive.

The power stage 108 also includes driver circuitry for providing respective gate drive signals to the gates of the high-side and low-side transistors of the power stage 108 in response to the PWM control signals provided by the controller 110. The driver circuitry and power transistors of the power stage 108 are not shown in FIG. 1 for ease of illustration. The activation state of each power stage phase and duty cycle of the corresponding high-side and low-side transistor are determined at least in part based on the output voltage Vout applied to the load 102 so that the voltage regulator 100 can react as quickly and reliably as possible to changing load conditions.

The controller 110 can manage changes from one reference voltage to another. The controller 110 can also determine errors between the output voltage Vout and a reference (target) voltage, and convert the error voltage into a digital representation provided to the PWM unit 112 of the controller 110 for modifying the switching cycle of power stage transistors e.g. by adjusting the duty cycle. The controller 110 can also implement transient support features such as active transient response for responding to transient events at the load e.g. by enabling all phases of a multiphase regulator to simultaneously source or sink current in response to a transient load event. Such voltage regulation functions are standard in typical digitally-controlled switching voltage regulators, and therefore no further explanation is given in this regard.

During step-up transient events at the load 102, charge stored on the output capacitor Cout is discharged to the load 102. Conversely, the output capacitor Cout absorbs energy from the load 102 during step-down transient events at the load. A step-up transient load event involves an instantaneous or near instantaneous increase in load current (e.g. 0 A or near 0 A to 200 A or more in less than 1 μs). A step-down transient load event involves an instantaneous or near instantaneous decrease in the load current.

The charge injection circuit 106 is capacitively coupled to the same node 104 as the output capacitor Cout. The term 'output capacitor' as used herein refers to a single capacitor or a capacitor bank. In either case, the charge injection circuit 106 is operable to inject charge onto the output capacitor Cout during step-up transient events and absorb charge from the output capacitor Cout during step-down transient events. No inductors are used to electrically couple the charge injection circuit 106 to the output capacitor Cout. This way, only parasitic inductance is present in the electrical pathway between the charge injection circuit 106 and the output capacitor Cout. As such, the charge injection circuit 106 provides instantaneous or near instantaneous support during step-up and step-down transient events at the load 102. According to one embodiment, the charge injection circuit 106 is disposed in a different semiconductor die than the voltage regulator 100. The die that includes the charge injection circuit 106 is positioned closer to the output capacitor Cout than the output inductor(s) of the voltage regulator 100 to reduce the parasitic inductance between the charge injection circuit 106 and the output capacitor Cout.

According to the embodiment illustrated in FIG. 1, the charge injection circuit 106 comprises a first switch S1, a second switch S2 and an auxiliary capacitor Caux. The auxiliary capacitor Caux has a first terminal 114 electrically coupled to the same node 104 as the output capacitor Cout without using an inductor, and a second terminal 116 switchably coupled to a first voltage rail e.g. Vin through the first switch S1 and to a second voltage rail (V2) different than the first voltage rail e.g. ground through the second switch S2. A bias voltage Vaux is applied to the second terminal 116 of the auxiliary capacitor Caux. The first switch S1 is configured to electrically couple the second terminal 116 of the auxiliary capacitor Caux to the first voltage rail during step-up transient events at the load 102, and the second switch S2 is configured to electrically couple the second terminal 116 of the auxiliary capacitor Caux to the second voltage rail V2 during step-down transient events at the load 102. Any standard type of transistor can be used as switches S1, S2. The open/closed state of the first switch S1 is controlled by a first signal ATRH, and the open/closed state of the second switch S2 is controlled by a second signal ATRL. The signals ATRH, ATRL can be generated by the charge injection circuit 106 or externally provided to the charge injection circuit 106 e.g. by the regulator controller 110.

Figure 2:
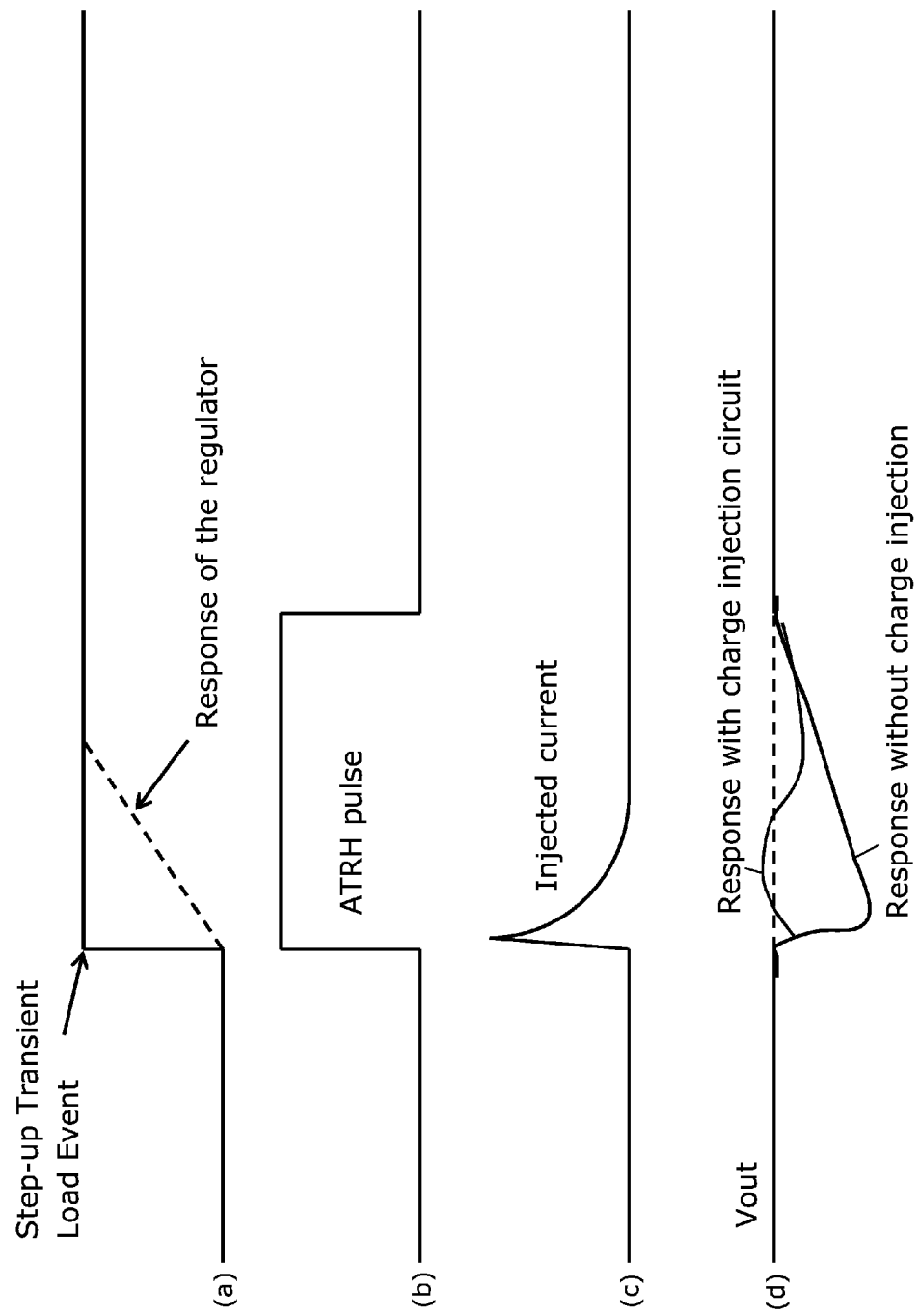
FIG. 2 illustrates various waveforms associated with operation of the switching voltage regulator shown in FIG. 1 leading up to and during a step-up transient load event.
Figure 3:
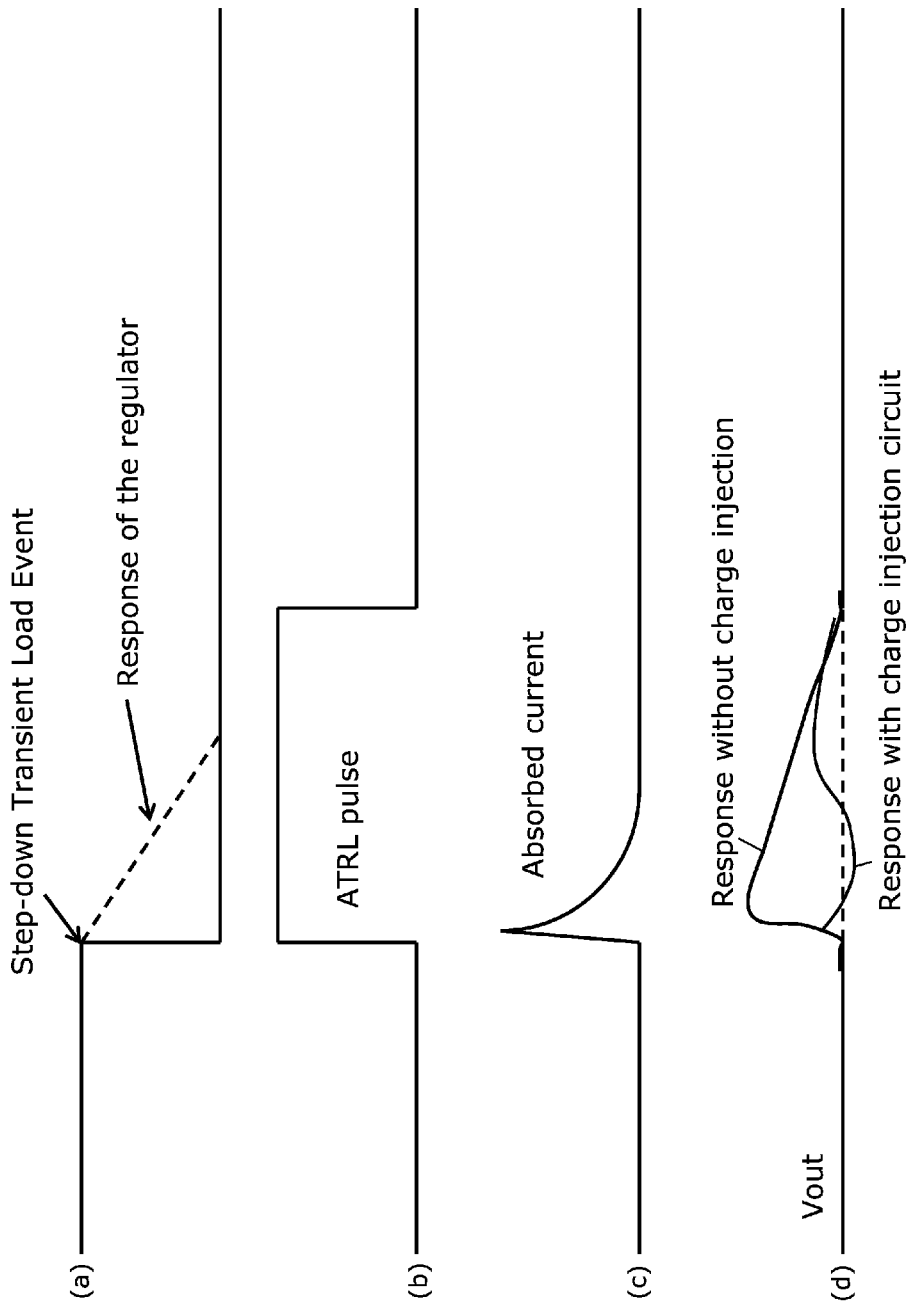
FIG. 3 illustrates various waveforms associated with operation of the switching voltage regulator shown in FIG. 1 leading up to and during a step-down transient load event.

FIG. 2 shows various waveforms which illustrate the operation of the charge injection circuit 106 leading up to and during a step-up transient event at the load 102, and FIG. 3 shows the same respective waveforms leading up to and during a step-down transient event at the load 102. In both Figures, waveform (a) illustrates the transient load event at the load 102 and the corresponding response of the regulator 100. Waveform (b) illustrates the state of the ATRH or ATRL signal, depending on the type (step-up or step-down) transient load event. Responsive to detecting an increasing load step, switch S1 is turned on via the ATRH signal and the auxiliary capacitor Caux charges to Vin–Vout during the step-up transient load event. The charge is transferred quickly from the auxiliary capacitor Caux to the output capacitor Cout. For decreasing load steps, switch S2 is turned on via the ATRL signal and the auxiliary capacitor Caux quickly absorbs charge from the output capacitor Cout and discharges the absorbed charge to ground or some other voltage rail lower than Vout during the step-down transient load event.

Waveform (c) illustrates the charge injected or absorbed by the charge injection circuit 106 during the transient load event, in response to the ATRH or ATRL signal. Waveform (d) illustrates the response of the output voltage Vout supplied from the regulator 100 to the load 102 with and without support from the charge injection circuit 106. For step-up transient load events, the charge injected onto the output capacitor Cout by the charge injection circuit 106 reduces or even eliminates droop in Vout so that Vout does not drop below an acceptable lower limit during step-up transient load events. For step-down transient load events, the charge absorbed from the output capacitor Cout by the charge injection circuit 106 reduces or even eliminates overshoot in Vout so that Vout does not exceed an acceptable upper limit during step-down transient load events. In both cases, because there is no active inductance between the auxiliary capacitor Caux and the output capacitor Cout, the step-up or step-down transition in the output voltage Vout is not slowed down due to slew rate limitations.

Voltage excursions across the auxiliary capacitor Caux of the charge injection circuit 106 can exceed 1V during transient load events. For example, the voltage excursions can exceed several volts. In contrast, voltage excursions across the output capacitor Cout of the regulator circuit typically cannot exceed the mV range to maintain proper regulation of the load 102. As such, the output capacitor Cout tends to be relatively large e.g. in the millifarad range. Because the auxiliary capacitor Caux of the charge injection circuit 106 is permitted to tolerate significantly larger voltage excursions, the auxiliary capacitor Caux can be significantly smaller than the output capacitor Cout e.g. in the microfarad range. In one embodiment, a ratio of the capacitance of the auxiliary capacitor Caux to the capacitance of the output capacitor Cout ranges from $1/20$ to $1/100$.

The charge injection circuit 106 can also implement zero-current switching to increase efficiency and reduce the size of the switches S1, S2 used to switchably couple the second terminal 116 of the auxiliary capacitor Caux to the first and second voltage rails. Zero-current switching involves turning off switches S1, S2 only when the capacitor current is at or near zero. For example during step-up transient events, the first switch S1 is turned on when the auxiliary capacitor current is at or near zero and turned off when the auxiliary capacitor current returns to zero or near zero as shown in waveform (c) of FIG. 2. During step-down transient events, the second switch S2 is turned on when the auxiliary capacitor current is at or near zero and turned off when the auxiliary capacitor current returns to zero or near zero as shown in waveform (c) of FIG. 3. This way, smaller high-ohmic transistors can be used to implement switches S1, S2 of the charge injection circuit 106.

The bias voltage Vaux applied to the second terminal 116 of the auxiliary capacitor Caux allows the charge on the auxiliary capacitor Caux to level out between transient load events. That is, the bias voltage Vaux clears the charge on the auxiliary capacitor Caux between transient load events. The bias voltage Vaux can be fixed or adjustable. The bias voltage Vaux is fixed according to the embodiment illustrated in FIG. 1. According to this embodiment, the charge injection circuit 106 further comprises a resistive divider network electrically coupled between the first voltage rail and the second voltage rail. The resistive divider network includes a first resistor R1 and a second resistor R2. The bias voltage Vaux is set based on the ratio R1/R2. Resistors R1 and R2 are relatively large e.g. in the kilo ohm range so that the auxiliary capacitor Caux has little to no effect during normal regulation and settles to the bias voltage Vaux between transient events.

Figure 4:
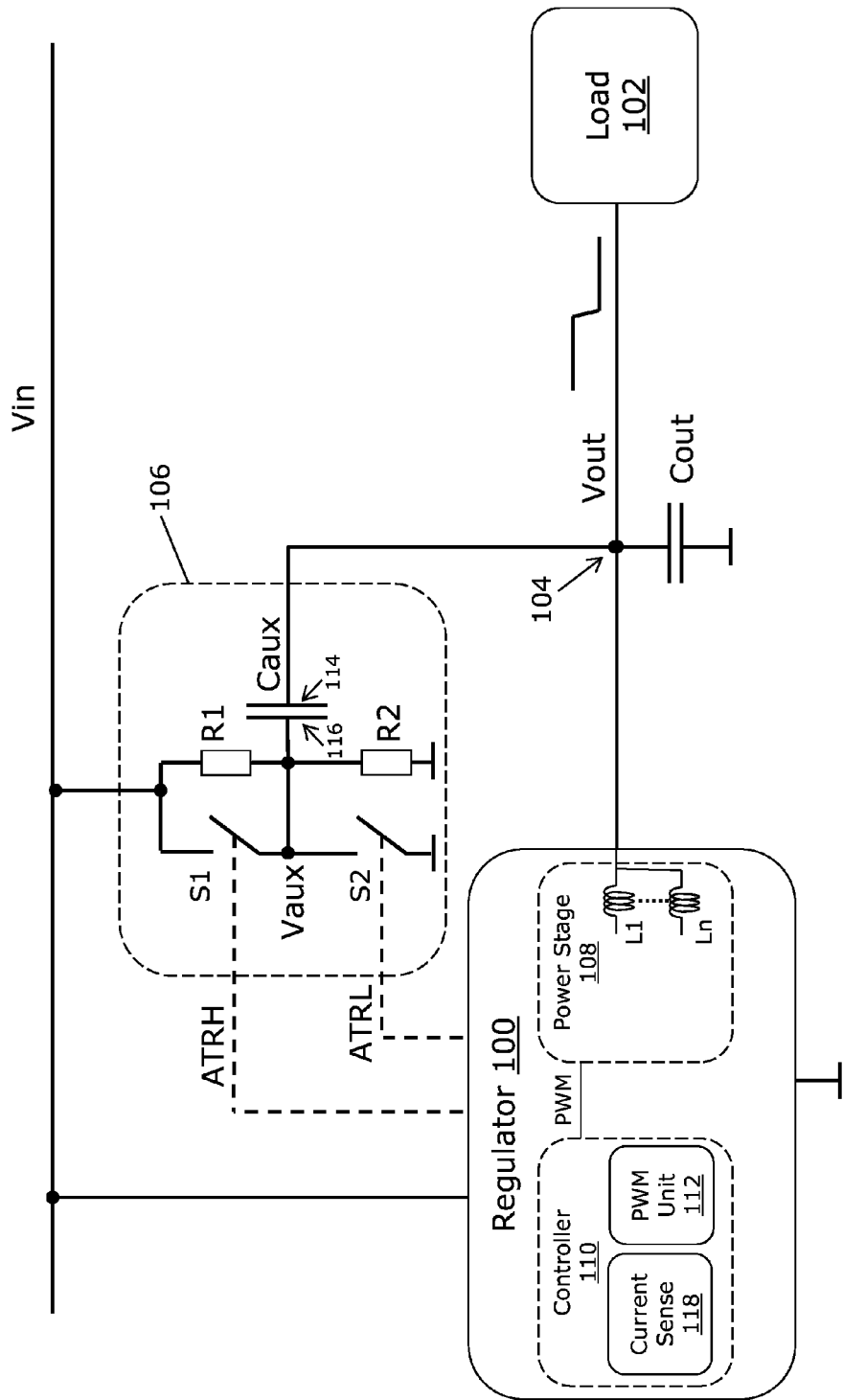
FIG. 4 illustrates a block diagram of another embodiment of a switching voltage regulator having instantaneous transient support.

FIG. 4 illustrates another embodiment of the voltage regulator circuit. The embodiment shown in FIG. 4 is similar to the embodiment shown in FIG. 1. Different however, the position of switches S1, S2 relative to resistors R1, R2 of the resistive divider network are reversed. Also, the regulator controller 110 is operable to sense current delivered to the load 102 by the voltage regulator 100 and control operation of the charge injection circuit 106 based on the sensed current via the ATRH and ATRL signals.

The controller 110 can include any standard current sense circuitry 118 for sensing the current delivered to the load 102. For example, the power stage 108 can include an RC current sense network coupled in parallel with each phase of the voltage regulator 100. The RC current sense network accounts for the DCR (non-ideal DC resistance) of the corresponding output inductor. The voltage measured across the sense capacitor of the RC current sense network represents the voltage across the DCR of that output inductor, meaning the current through the inductor is related to the ratio of the capacitor voltage to DCR value. The current sense circuitry 118 can estimate the current through each inductor based on the voltage measured across the sense capacitors of the respective RC current sense networks. In another example, the current sense circuitry 118 can be an integrated current sensor where the current sense circuitry 118 senses the current through the respective output inductors. Still other standard current sense approaches can be used.

The ATRH and ATRL signals are generated internally by the controller 110 as part of standard current sense and transient support features implemented by the regulator circuit e.g. such as active transient response. According to the embodiment illustrated in FIG. 4, the controller 110 outputs the ATRH and ATRL signals to the charge injection circuit 106. The ATRH and ATRL signals are received at the charge injection circuit 106 and control the on/off state of switches S1, S2 as previously described herein.

Figure 5:
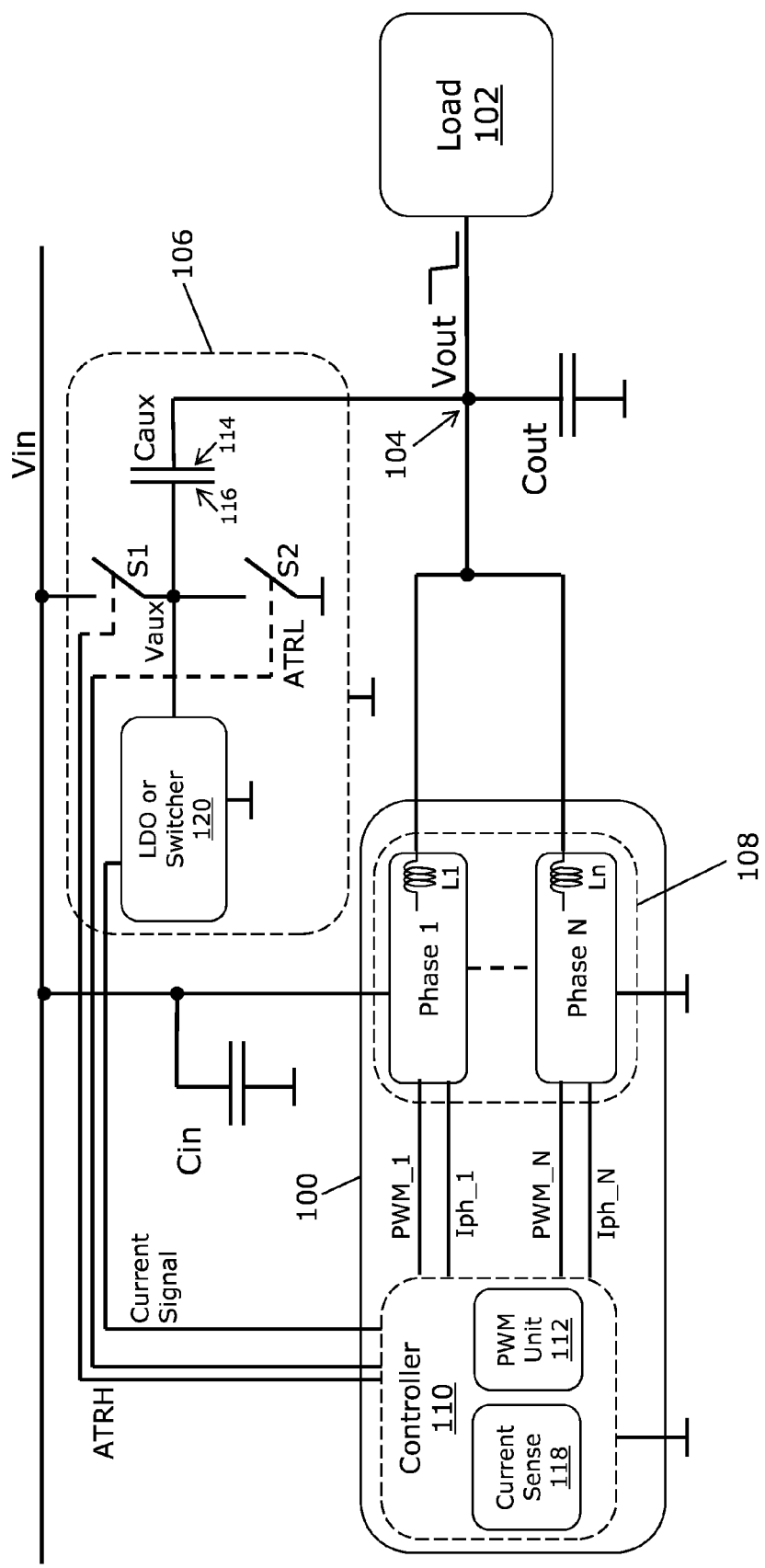
FIG. 5 illustrates a block diagram of yet another embodiment of a switching voltage regulator having instantaneous transient support.

FIG. 5 illustrates yet another embodiment of the voltage regulator circuit. In FIG. 5, the switching voltage regulator 100 is implemented as a multi-phase regulator where each phase ('Phase 1', . . . , 'Phase N') of the power stage 108 delivers current (Iph1, . . . , Iph_N) to the load 102. The PWM unit 112 of the controller 110 manages switching of each phase of the power stage 108 via a corresponding PWM control signal (PWM1, . . . , PWM_N) so that the power stage 108 sources or sinks current to the load 102 through the corresponding output inductor (L1, . . . , Ln). The embodiment shown in FIG. 5 is similar to the embodiment shown in FIG. 1. Different however, the bias voltage Vaux applied to the second terminal 116 of the auxiliary capacitor Caux of the charge injection circuit 106 is dynamically adjustable. In one embodiment, the bias voltage Vaux is dynamically adjusted as a function of load current. For example, the bias voltage Vaux can be decreased if a step-up transient event is more stringent than a step-down transient event and increased if the step-down transient event is more stringent than the step-up transient event. A step-up transient event is more stringent than a step-down transient event when the load current is at or near zero and must quickly ramp to e.g. 200 A or more. In this case, the bias voltage Vaux can be set such that the auxiliary capacitor Caux is charged to Vin. Conversely, a step-down transient event is more stringent than a step-up transient event when the load current is at near its maximum value e.g. 200 A or more and must quickly ramp downward to zero or near zero. In this case, the bias voltage Vaux can be set such that the auxiliary capacitor Caux is discharged to ground.

Further according to the embodiment shown in FIG. 5, the charge injection circuit 106 comprises a linear voltage regulator or a switcher 120 which is operable to set the bias voltage Vaux applied to the second terminal 116 of the auxiliary capacitor Caux based on a current signal received from the regulator controller 110. The current signal is a function of the total current supplied to the load 102 by the voltage regulator 100, which is sensed by the current sense circuitry 118 of the controller 110 as previously described herein.

In still another embodiment, the regulator controller 110 generates the bias voltage Vaux and applies Vaux to the second terminal 116 of the auxiliary capacitor Caux. For example, the controller 110 can determine the bias voltage Vaux based on the load current sensed by the current sense circuitry 118.

In yet another embodiment, an existing voltage rail can be used as the bias voltage Vaux applied to the second terminal 116 of the auxiliary capacitor Caux so long as the voltage rail is ohmic enough to clear charge on the auxiliary capacitor Caux between transients but not too ohmic so that the charge is not sufficiently cleared.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A voltage regulator circuit, comprising:
   a voltage regulator electrically coupled to a load through an output inductor and operable to regulate a voltage applied to the load;
   an output capacitor electrically coupled to a node between the inductor and the load, the output capacitor configured to discharge energy stored in the capacitor to the load during step-up transient events at the load and absorb energy from the load during step-down transient events at the load; and
   a charge injection circuit capacitively coupled to the node and operable to inject charge onto the output capacitor during the step-up transient events and absorb charge from the output capacitor during the step-down transient events,
   wherein the charge injection circuit comprises:
      a first switch;
      a second switch;
      an auxiliary capacitor having a first terminal electrically coupled to the node without using an inductor and a second terminal switchably coupled to a first voltage rail through the first switch and to a second voltage rail different than the first voltage rail through the second switch; and
      a bias voltage applied to the second terminal of the auxiliary capacitor,
      wherein the first switch is configured to electrically couple the second terminal of the auxiliary capacitor to the first voltage rail during the step-up transient events, wherein the second switch is configured to electrically couple the second terminal of the auxiliary capacitor to the second voltage rail during the step-down transient events.

2. The voltage regulator circuit of claim 1, wherein the charge injection circuit further comprises:
a resistive divider network electrically coupled between the first voltage rail and the second voltage rail and configured to provide the bias voltage applied to the second terminal of the auxiliary capacitor.

3. The voltage regulator circuit of claim 1, wherein the bias voltage is dynamically adjusted as a function of load current.

4. The voltage regulator circuit of claim 3, wherein the bias voltage is decreased if the step-up transient events are more stringent than the step-down transient events, and wherein the bias voltage is increased if the step-down transient events are more stringent than the step-up transient events.

5. The voltage regulator circuit of claim 1, wherein a ratio of the capacitance of the auxiliary capacitor to the capacitance of the output capacitor ranges from $1/20$ to $1/100$.

6. The voltage regulator circuit of claim 1, wherein during the step-up transient events the first switch is configured to turn on when the auxiliary capacitor current is at or near zero and turn-off when the auxiliary capacitor current returns to zero or near zero, and wherein during the step-down transient events the second switch is configured to turn on when the auxiliary capacitor current is at or near zero and turn-off when the auxiliary capacitor current returns to zero or near zero.

7. The voltage regulator circuit of claim 1, wherein the auxiliary capacitor current has voltage excursions which exceed 1V during the step-up and the step-down transient events.

8. The voltage regulator circuit of claim 1, wherein the charge injection circuit comprises a liner voltage regulator or a switcher operable to set the bias voltage applied to the second terminal of the auxiliary capacitor based on a current signal received from a controller of the voltage regulator.

9. The voltage regulator circuit of claim 8, wherein the controller determines the bias voltage applied to the second terminal of the auxiliary capacitor.

10. The voltage regulator circuit of claim 1, further comprising:
a controller operable to control operation of the voltage regulator, sense the current delivered to the load by the voltage regulator, and control operation of the charge injection circuit based on the sensed current.

11. The voltage regulator circuit of claim 1, wherein the charge injection circuit is disposed in a different semiconductor die than the voltage regulator, and wherein the die that includes the charge injection circuit is positioned closer to the output capacitor than the output inductor.

12. A method of regulating a load, the method comprising:
regulating a voltage applied to the load via a voltage regulator electrically coupled to the load through an output inductor;
discharging energy stored in an output capacitor to the load during step-up transient events at the load, the output capacitor being electrically coupled to a node between the inductor and the load;
absorbing energy from the load via the output capacitor during step-down transient events at the load;
injecting charge onto the output capacitor during the step-up transient events via a charge injection circuit capacitively coupled to the node; and
absorbing charge from the output capacitor during the step-down transient events via the charge injection circuit,
wherein injecting charge onto the output capacitor during the step-up transient events via the charge injection circuit and absorbing charge from the output capacitor during the step-down transient events via the charge injection circuit comprises:
electrically coupling a first terminal of an auxiliary capacitor of the charge injection circuit to the node without using an inductor;
applying a bias voltage to a second terminal of the auxiliary capacitor;
electrically coupling the second terminal of the auxiliary capacitor to a first voltage rail through a first switch of the charge injection circuit during the step-up transient events; and
electrically coupling the second terminal of the auxiliary capacitor to a second voltage rail different than the first voltage rail through a second switch of the charge injection circuit during the step-down transient events.

13. The method of claim 12, further comprising:
dynamically adjusting the bias voltage as a function of load current.

14. The method of claim 12, wherein electrically coupling the second terminal of the auxiliary capacitor to the first voltage rail through the first switch during the step-up transient events and electrically coupling the second terminal of the auxiliary capacitor to the second voltage rail through the second switch during the step-down transient events comprises:
during the step-up transient events, turning on the first switch when the auxiliary capacitor current is at or near zero and turning off the first switch when the auxiliary capacitor current returns to zero or near zero; and
during the step-down transient events, turning on the second switch when the auxiliary capacitor current is at or near zero and turning off the second switch when the auxiliary capacitor current returns to zero or near zero.

15. A charge injection circuit for a voltage regulator circuit electrically coupled to a load through an output inductor and having an output capacitor electrically coupled to a node between the inductor and the load, the charge injection circuit comprising:
a first switch;
a second switch;
an auxiliary capacitor having a first terminal electrically coupled to the node without using an inductor and a second terminal switchably coupled to a first voltage rail through the first switch and to a second voltage rail different than the first voltage rail through the second switch; and
a bias voltage applied to the second terminal of the auxiliary capacitor,
wherein the first switch is configured to electrically couple the second terminal of the auxiliary capacitor to the first voltage rail during step-up transient events at the load,
wherein the second switch is configured to electrically couple the second terminal of the auxiliary capacitor to the second voltage rail during step-down transient events at the load.

16. The charge injection circuit of claim 15, wherein the bias voltage is dynamically adjusted as a function of load current.

17. The charge injection circuit of claim 15, wherein during the step-up transient events the first switch is configured to turn on when the auxiliary capacitor current is at or near zero and turn-off when the auxiliary capacitor current returns to zero or near zero, and wherein during the step-down transient events the second switch is configured to turn on when the auxiliary capacitor current is at or near zero and turn-off when the auxiliary capacitor current returns to zero or near zero.

18. The charge injection circuit of claim 15, further comprising a liner voltage regulator or a switcher operable to set the bias voltage applied to the second terminal of the auxiliary capacitor based on a current signal received from a controller of the voltage regulator.

* * * * *